(12) United States Patent
Hirukawa et al.

(10) Patent No.: US 10,066,674 B2
(45) Date of Patent: Sep. 4, 2018

(54) FIXED-TYPE CONSTANT VELOCITY UNIVERSAL JOINT

(71) Applicants: Hiroyasu Hirukawa, Shizuoka (JP); Teruaki Fujio, Shizuoka (JP)

(72) Inventors: Hiroyasu Hirukawa, Shizuoka (JP); Teruaki Fujio, Shizuoka (JP)

(73) Assignee: NTN CORPORATION, Osaka (JP)

( * ) Notice: Subject to any disclaimer, the term of this patent is extended or adjusted under 35 U.S.C. 154(b) by 67 days.

(21) Appl. No.: 14/899,856

(22) PCT Filed: May 26, 2014

(86) PCT No.: PCT/JP2014/063853
§ 371 (c)(1),
(2) Date: Dec. 18, 2015

(87) PCT Pub. No.: WO2014/208241
PCT Pub. Date: Dec. 31, 2014

(65) Prior Publication Data
US 2016/0146260 A1 May 26, 2016

(30) Foreign Application Priority Data
Jun. 26, 2013 (JP) ................................. 2013-133809

(51) Int. Cl.
*F16D 3/224* (2011.01)
*F16D 3/223* (2011.01)

(52) U.S. Cl.
CPC .............. *F16D 3/224* (2013.01); *F16D 3/223* (2013.01); *F16D 2003/22303* (2013.01); *F16D 2003/22309* (2013.01); *Y10S 464/906* (2013.01)

(58) Field of Classification Search
CPC ..................... F16D 3/223; F16D 3/224; F16D 2003/22303; F16D 2003/22309; Y10S 464/906
(Continued)

(56) References Cited

U.S. PATENT DOCUMENTS 6,736,729 B2 * 5/2004 Wang ...................... F16D 3/223
464/15 X
8,568,245 B2 * 10/2013 Fujio ...................... F16D 3/224
464/144
(Continued)

FOREIGN PATENT DOCUMENTS

| CN | 102046995 | 5/2011 |
| EP | 2 284 411 | 2/2011 |

(Continued)

OTHER PUBLICATIONS

Universal Joint and Driveshaft Design Manual, AE-7, Society of Automoitive Engineers, Inc., pp. 163-166, TJ1079.S62 1979.*
(Continued)

*Primary Examiner* — Greg Binda
(74) *Attorney, Agent, or Firm* — Wenderoth, Lind & Ponack, L.L.P.

(57) ABSTRACT

A fixed type constant velocity universal joint of a track groove crossing type has track grooves of an inner joint member formed to be mirror-image symmetrical with paired track grooves of an outer joint member with respect to a joint center plane at an operating angle of 0°. The track grooves of both the joint members each have a length corresponding to a maximum operating angle ($\theta$max) required for a propeller shaft, and surface treatment is performed, for example, on a defined surface of each of the track grooves of the outer joint member so as to reduce frictional resistance (sliding resistance) against balls.

5 Claims, 13 Drawing Sheets

(58) Field of Classification Search
USPC .......................................... 464/8, 9, 15, 144
See application file for complete search history.

(56) References Cited

U.S. PATENT DOCUMENTS

| | | | |
|---|---|---|---|
| 9,133,886 B2* | 9/2015 | Kohara | F16D 3/223 |
| 2007/0060398 A1 | 3/2007 | Schwarzler et al. | |
| 2010/0216559 A1 | 8/2010 | Braun et al. | |
| 2011/0034255 A1 | 2/2011 | Kobayashi et al. | |
| 2012/0202607 A1 | 8/2012 | Fujio | |
| 2014/0073441 A1 | 3/2014 | Yamazaki et al. | |

FOREIGN PATENT DOCUMENTS

| | | |
|---|---|---|
| JP | 2007-503556 | 2/2007 |
| JP | 2009-250342 | 10/2009 |
| JP | 2009-250365 | 10/2009 |
| JP | 2010-43667 | 2/2010 |
| JP | 2010-527427 | 8/2010 |
| JP | 2011-112117 | 6/2011 |
| WO | WO 2011/043268 A1 * | 4/2011 |
| WO | 2012/0165096 | 12/2012 |

OTHER PUBLICATIONS

International Preliminary Report on Patentability and Written Opinion of the International Searching Authority dated Dec. 29, 2015 in International (PCT) Application No. PCT/JP2014/063853.
International Search Report dated Aug. 26, 2014 in International (PCT) Application No. PCT/JP2014/063853.
Extended European Search Report dated Jan. 25, 2017 in corresponding European Application No. 14817418.8.
Chinese Office Action dated Jun. 29, 2017 in counterpart Chinese Patent Application No. 201480036637.4 with English translation.

* cited by examiner

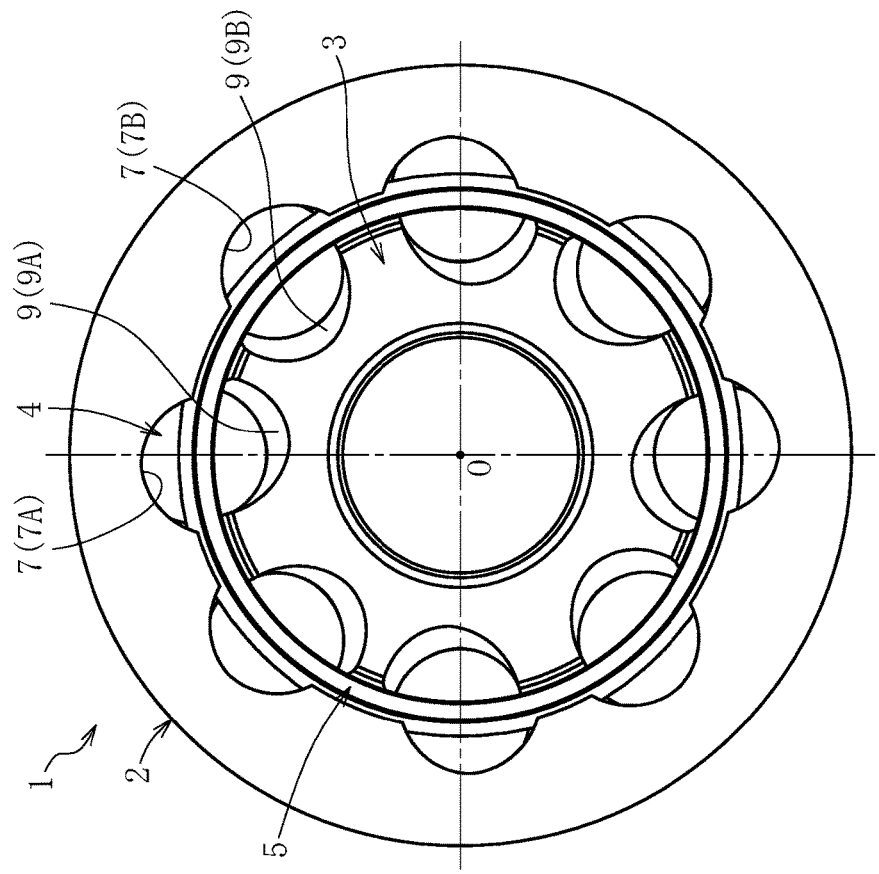
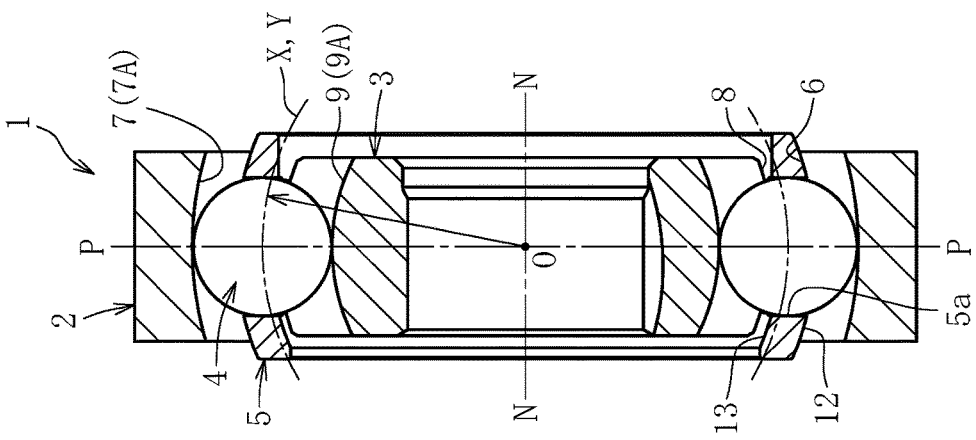

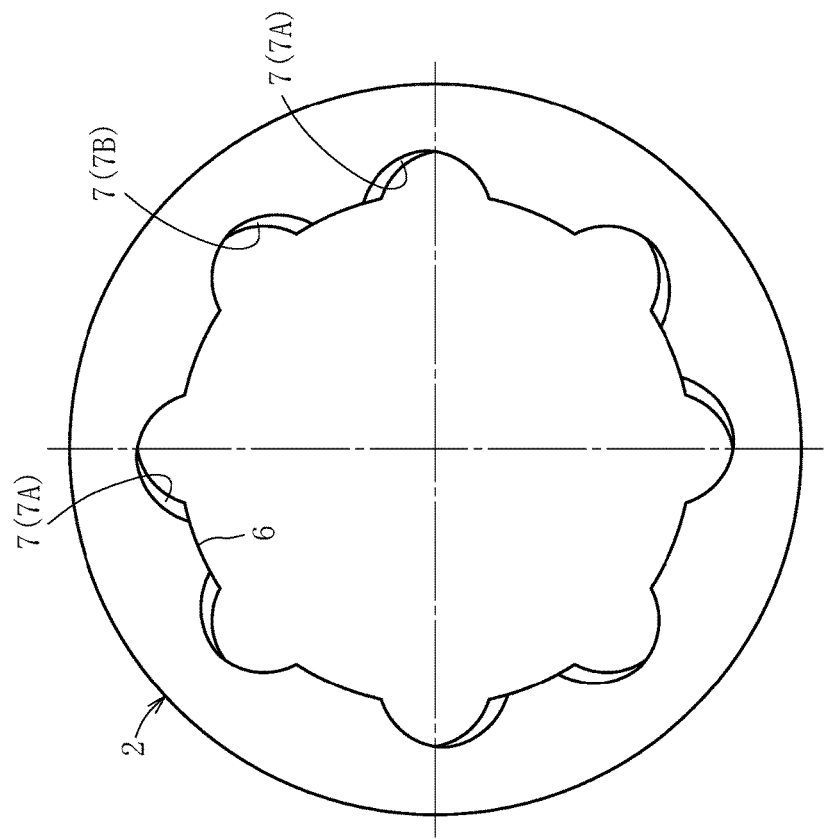
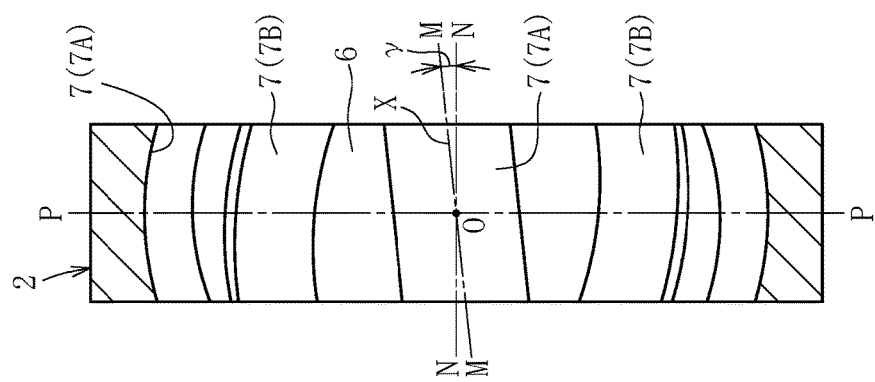

Fig. 6A
Fig. 6B
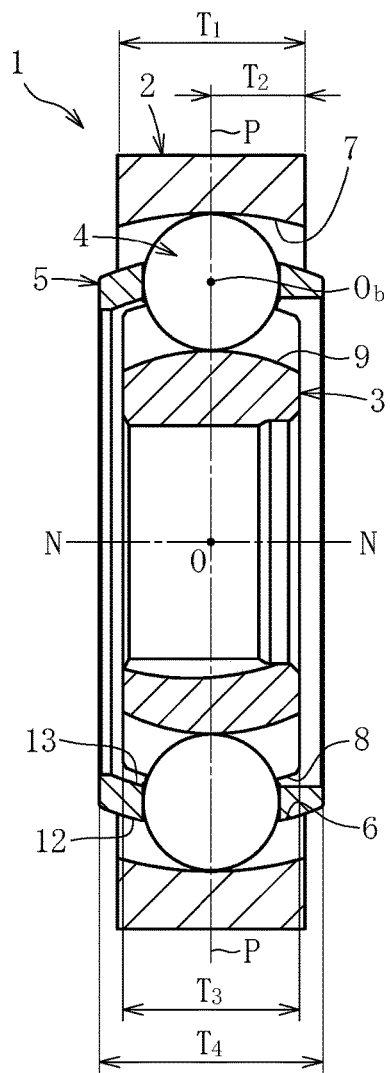
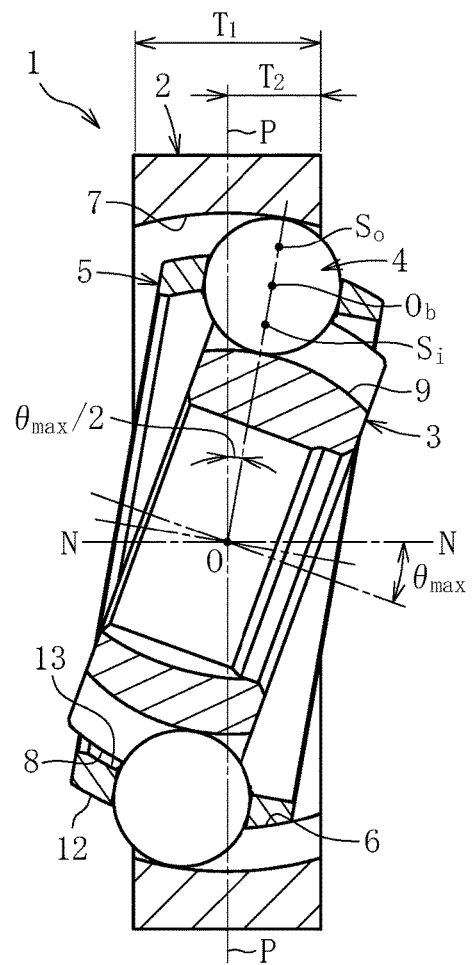

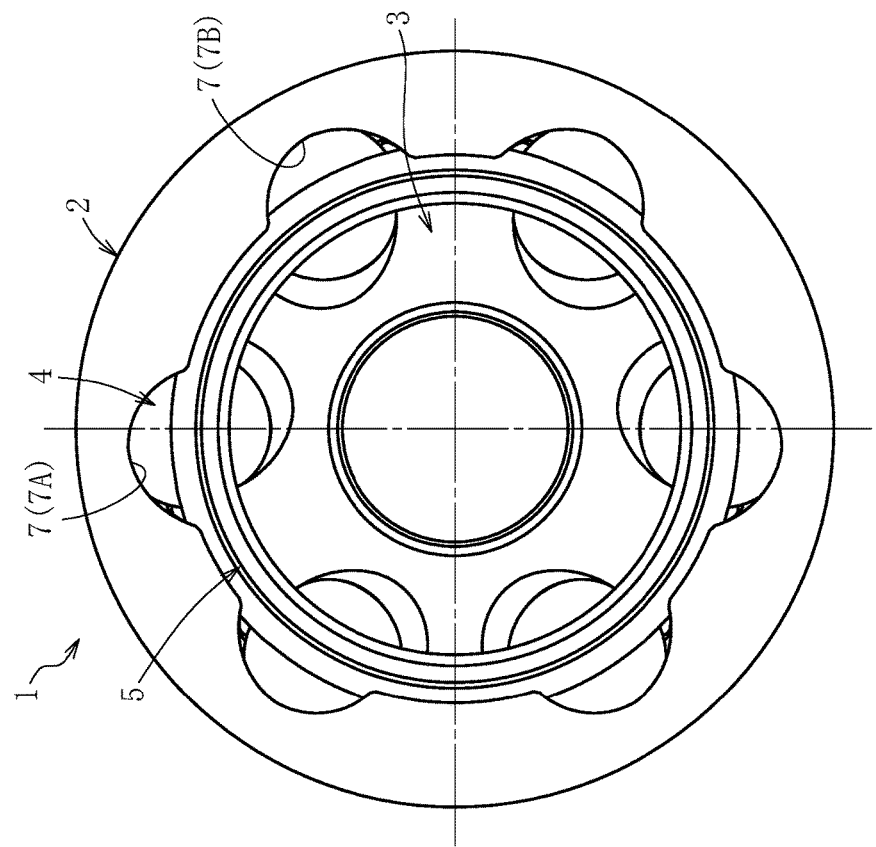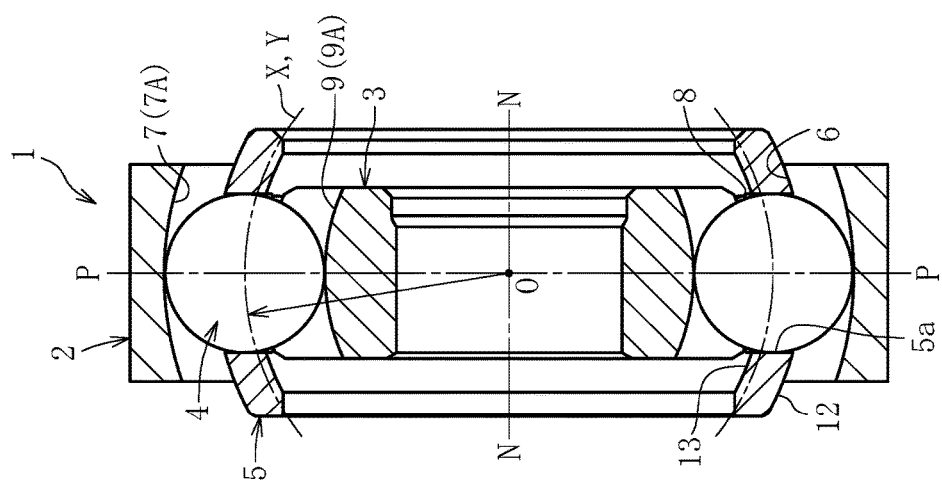
Fig. 12A
Fig. 12B

FIXED-TYPE CONSTANT VELOCITY UNIVERSAL JOINT

TECHNICAL FIELD

The present invention relates to a fixed type constant velocity universal joint to be used in a power transmission system of automobiles and various industrial machines, for allowing only angular displacement between two shafts on a driving side and a driven side. More particularly, the present invention relates to a fixed type constant velocity universal joint to be used in a propeller shaft.

BACKGROUND ART

As fixed type constant velocity universal joints, there have been publicly known joints of, for example, a so-called six-ball Rzeppa type (BJ) and a six-ball undercut-free type (UJ), and an eight-ball Rzeppa type (EBJ) and an eight-ball undercut-free type (EUJ). Those joints are used as appropriate in accordance with usage, required characteristics, and the like. Further, there have also been proposed various fixed type constant velocity universal joints of a so-called track groove crossing type (for example, Patent Literature 1).

Referring to FIG. 13A and FIG. 13B, description is given of a fixed type constant velocity universal joint of a track groove crossing type disclosed in Patent Literature 1. FIG. 13A is a vertical sectional view of a state in which the fixed type constant velocity universal joint disclosed in Patent Literature 1 forms an operating angle of 0°, and FIG. 13B is a vertical sectional view of a state in which the fixed type constant velocity universal joint forms an operating angle (maximum operating angle θmax: 47 °). The constant velocity universal joint 121 includes an outer joint member 122, an inner joint member 123, balls 124, and a cage 125. In the constant velocity universal joint 121, a plurality of (for example, eight) arc-shaped track grooves 127 are formed in a spherical inner peripheral surface 126 of the outer joint member 122. The track grooves 127 are formed so that planes including ball raceway center lines x of the track grooves 127 are inclined with respect to a joint axial line n-n and the track grooves 127 are adjacent to each other in a peripheral direction with their inclination directions opposite to each other (detailed illustration of states of the inclination is omitted). Further, although detailed illustration is omitted, a plurality of (for example, eight) arc-shaped track grooves 129 are formed in a spherical outer peripheral surface 128 of the inner joint member 123. The track grooves 129 are formed so as to be mirror-image symmetrical with the paired track grooves 127 of the outer joint member 122 with respect to a plane P including a joint center O at the operating angle of 0°. That is, the inner joint member 123 is assembled to an inner periphery of the outer joint member 122 so that the paired track grooves 127 and 129 cross each other.

As illustrated in FIG. 13A, curvature centers of the arc-shaped track grooves 127 of the outer joint member 122 and the arc-shaped track grooves 129 of the inner joint member 123 are each positioned at the joint center O. Each ball 124 is interposed in a crossing portion between the track groove 127 of the outer joint member 122 and the track groove 129 of the inner joint member 123, which are paired with each other. The balls 124 are held in pocket portions 125a of the cage 125 arranged between the outer joint member 122 and the inner joint member 123. Curvature centers of a spherical outer peripheral surface 132 and a spherical inner peripheral surface 133 of the cage 125 are each positioned at the joint center O. In the constant velocity universal joint 121, the paired track grooves 127 and 129 cross each other, and the balls 124 are interposed in those crossing portions. Therefore, when the joint forms an operating angle, the balls 124 are always guided in a plane bisecting an angle formed between axial lines of the outer joint member 122 and the inner joint member 123. As a result, rotational torque is transmitted at a constant velocity between the two axes.

As described above, the track grooves 127 and 129 of the outer joint member 122 and the inner joint member 123 are adjacent to each other in the peripheral direction with their inclination directions opposite to each other. Therefore, when both the joint members 122 and 123 rotate relative to each other, forces in the opposite directions are applied from the balls 124 to the pocket portions 125a of the cage 125 that are adjacent to each other in the peripheral direction. Due to the forces in the opposite directions, the cage 125 is stabilized at the position of the joint center O. Thus, a contact force between the spherical outer peripheral surface 132 of the cage 125 and the spherical inner peripheral surface 126 of the outer joint member 122, and a contact force between the spherical inner peripheral surface 133 of the cage 125 and the spherical outer peripheral surface 128 of the inner joint member 123 are suppressed. Accordingly, torque loss and heat generation are suppressed. As a result, it is possible to attain a constant velocity universal joint that is excellent in torque transmission efficiency and durability.

CITATION LIST

Patent Literature 1: JP 2009-250365 A

SUMMARY OF INVENTION

Technical Problem

Incidentally, the fixed type constant velocity universal joint 121 described above is designed for application to drive shafts, specifically, front-wheel drive shafts (more specifically, on its outboard side) that form an especially high operating angle (practical maximum operating angle θmax of, for example, 40° or more). The track grooves of the fixed type constant velocity universal joint need to have lengths that prevent, even when the joint forms the maximum operating angle θmax, the balls from dropping off end portions on an opening side of the track grooves of the outer joint member, and end portions on an interior side of the track grooves of the inner joint member. Thus, in the fixed type constant velocity universal joint 121 described above, values of an axial dimension $t_1$ of a mouth portion 122a of the outer joint member 122, an axial dimension $t_2$ from the joint center O to the end portion of the outer joint member 122 on the opening side, an axial dimension $t_3$ of the inner joint member 123, and an axial dimension $t_4$ of the cage 125 are set so that, even when the joint forms the maximum operating angle θmax, the balls 124 are not disengaged from the track grooves 127 and 129.

The fixed type constant velocity universal joint is assembled also for use in a propeller shaft for transmitting rotational power from a transmission to a differential, mainly, in a propeller shaft of an FR vehicle and a 4WD vehicle. Operating angles to be formed by the fixed type constant velocity universal joint for the propeller shaft are not as high as those to be formed by fixed type constant velocity universal joints for the front-wheel drive shafts. Specifically, an operating angle to be formed during travel of a vehicle by the fixed type constant velocity universal joint for the propeller shaft is approximately 10°. Further, in consideration of a folding angle at the time of mounting the propeller shaft to the vehicle, and allowance for up-and-down bounce of the vehicle during travel on rough roads, it is only necessary that a maximum operating angle θmax of approximately 20° be formed. Thus, when the design concept of Patent Literature 1 is applied as it is to the fixed type constant velocity universal joint for the propeller shaft, there arise problems with compactification and weight reduction because the above-mentioned dimensions $t_4$ to $t_4$ are unnecessarily large.

In addition, as described above, the fixed type constant velocity universal joint of the track groove crossing type has a structural feature to have high efficiency and durability. However, there may be still room for improvement in that, when frictional resistance (sliding resistance) in contact portions between components is decreased, torque loss and heat generation can be further suppressed to achieve even higher efficiency.

In view of the circumstances, the present invention has an object to provide a compact and lightweight fixed type constant velocity universal joint capable of achieving even higher efficiency and suited to propeller shafts.

Solution to Problem

According to one embodiment of the present invention, which is devised to attain the above-mentioned object, there is provided a fixed type constant velocity universal joint, comprising: an outer joint member having a spherical inner peripheral surface in which a plurality of track grooves are formed so as to extend in an axial direction of the outer joint member; an inner joint member having a spherical outer peripheral surface in which a plurality of track grooves are formed so as to be paired with the plurality of track grooves of the outer joint member; a plurality of balls for transmitting torque, the balls being interposed between the plurality of track grooves of the outer joint member and the plurality of track grooves of the inner joint member; and a cage comprising pocket portions for receiving the balls, the cage having: a spherical outer peripheral surface fitted to the spherical inner peripheral surface of the outer joint member; and a spherical inner peripheral surface fitted to the spherical outer peripheral surface of the inner joint member, wherein the plurality of track grooves of the outer joint member are each formed into an arc shape having a curvature center that is prevented from being offset in the axial direction with respect to a joint center, the plurality of track grooves of the outer joint member being inclined in a peripheral direction of the outer joint member with respect to a joint axial line and being adjacent to each other in the peripheral direction with their inclination directions opposite to each other, wherein the plurality of track grooves of the inner joint member are formed so as to be mirror-image symmetrical with the plurality of paired track grooves of the outer joint member with respect to a joint center plane at an operating angle of 0°, wherein the plurality of track grooves of the outer joint member and the plurality of track grooves of the inner joint member each have a length corresponding to a maximum operating angle required for a propeller shaft, wherein the fixed type constant velocity universal joint is subjected to surface treatment in at least one surface selected from the group consisting of: a defined surface of each of the plurality of track grooves of the outer joint member; the spherical inner peripheral surface of the outer joint member; a defined surface of each of the plurality of track grooves of the inner joint member; the spherical outer peripheral surface of the inner joint member; an outer surface of each of the balls; the spherical outer peripheral surface of the cage; the spherical inner peripheral surface of the cage; and a defined surface of each of the pocket portions of the cage, the surface treatment being performed so as to reduce frictional resistance of the at least one surface against a mating member that relatively moves in contact with the at least one surface.

Note that, the "joint axial line" herein refers to a longitudinal axial line that is a joint rotation center, and corresponds to a joint axial line N-N in the embodiments described later. Further, the "joint center plane at the operating angle of 0°" refers to a plane including the joint center at the operating angle of 0° and extending in a direction orthogonal to the joint axial line, and corresponds to a plane P in the embodiments described later (see, for example, FIG. 1A).

As described above, in the fixed type constant velocity universal joint according to the present invention, the track grooves of the outer joint member and the track grooves of the inner joint member each have the length corresponding to the maximum operating angle required for the propeller shaft. That is, axial dimensions of the parts of the outer joint member, the inner joint member, and the cage, which directly influence the lengths of the track grooves, are decreased to be smaller than those in the fixed type constant velocity universal joint of Patent Literature 1. Thus, it is possible to attain a constant velocity universal joint that is lightweight, compact, and suited to the propeller shaft.

Further, as described above, when the surface treatment is performed on the at least one surface selected from the group consisting of the above-mentioned surfaces so as to reduce the frictional resistance against the mating member that relatively moves in contact with this surface, frictional resistance (sliding resistance) in at least one contact portion of contact portions between the plurality of members arranged in the constant velocity universal joint can be decreased. Thus, the effect of suppressing torque loss and heat generation is further increased, and even higher efficiency of the fixed type constant velocity universal joint can be achieved. Note that, as long as the frictional resistance against the mating member can be decreased, treatment of any type may be selected as the above-mentioned "surface treatment." Specifically, there may be performed, for example, a process of forming lubricating films containing a solid lubricant (lubricant coating), barreling for forming numerous fine recessed portions to serve as an oil storage, a process of forming resin films (resin coating), and surface modification processes such as shot peening and shot blasting.

The curvature centers of the track grooves may be arranged on the joint axial line. With this, the depths of the track grooves can be set equal to each other, and processes thereon can be simplified. Further, the curvature centers of the track grooves may be arranged at positions offset in a radial direction with respect to the joint axial line. With this, track groove depths on an opening side and an interior side (opposite side to the opening) can be adjusted in accordance with the offset amount, and hence optimum track groove depth can be secured.

In the structure described above, the number of the balls to be used is not particularly limited, and may be set to, for example, any one of six, eight, ten, and twelve. The number of the balls may be set in accordance with the required characteristics. Specifically, when the number of the balls is set to six, there are such advantages in that the total number of components is smaller than that in the case where the number of the balls is set to eight, that satisfactory processability and assembly efficiency of the members can be achieved, and that a load capacity can be increased in accordance with increase in size of the balls. On the other hand, when the number of the balls is set to eight, there are such advantages in that further weight reduction and compactification, and less torque loss can be achieved (higher efficiency can be achieved) as compared to the case where the number of the balls is set to six. When the number of the balls is set to ten or twelve, yet further weight reduction and compactification, and even higher efficiency can be achieved.

Advantageous Effects of Invention

As described above, according to the one embodiment of the present invention, it is possible to attain the compact and lightweight fixed type constant velocity universal joint that has even higher efficiency and is suited to the propeller shafts.

BRIEF DESCRIPTION OF DRAWINGS

FIG. 1A is a vertical sectional view of a fixed type constant velocity universal joint according to a first embodiment of the present invention.

FIG. 1B is a front view of the fixed type constant velocity universal joint according to the first embodiment of the present invention.

FIG. 2A is a vertical sectional view of an outer joint member illustrated in FIG. 1.

FIG. 2B is a front view of the outer joint member illustrated in FIG. 1.

FIG. 6A is a view for illustrating dimensions of parts of the fixed type constant velocity universal joint illustrated in FIG. 1.

FIG. 6B is a schematic view of a state in which the constant velocity universal joint illustrated in FIG. 1 forms a maximum operating angle.

FIG. 12A is a partial vertical sectional view of a fixed type constant velocity universal joint according to a fourth embodiment of the present invention.

FIG. 12B is a front view of the fixed type constant velocity universal joint illustrated in FIG. 12A.

DESCRIPTION OF EMBODIMENTS

Figure 3A:
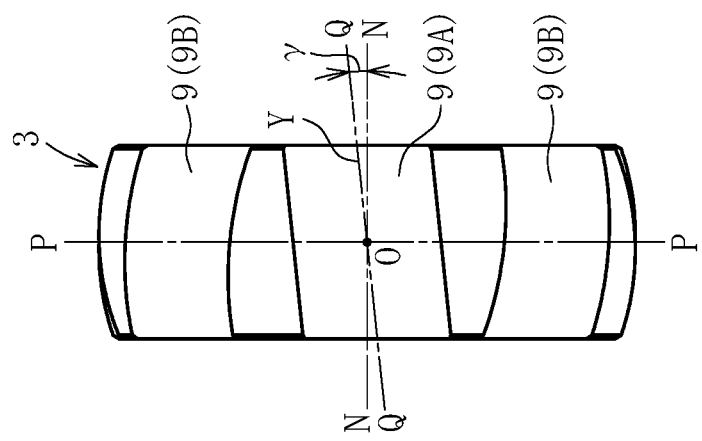
FIG. 3A is a side view of an inner joint member illustrated in FIG. 1.

Now, embodiments of the present invention are described with reference to the drawings.

FIG. 1A is a partial vertical sectional view of a fixed type constant velocity universal joint 1 according to a first embodiment of the present invention, and FIG. 1B is a front view of the constant velocity universal joint 1 (right-hand side view of FIG. 1A). The constant velocity universal joint 1 is used in a state of being assembled to a propeller shaft, and comprises an outer joint member 2, an inner joint member 3, balls 4, and a cage 5.

As illustrated also in FIG. 2A and FIG. 2B, eight track grooves 7 are formed in a spherical inner peripheral surface 6 of the disc-shaped (ring-shaped) outer joint member 2 so as to extend along an axial direction. The track grooves 7 comprise track grooves 7A and 7B that are inclined at an angle γ in a peripheral direction with respect to a joint axial line N-N and adjacent to each other in the peripheral direction with their inclination directions opposite to each other. As illustrated also in FIG. 3A and FIG. 3B, eight track grooves 9 are formed in a spherical outer peripheral surface 8 of the inner joint member 3 so as to extend along the axial direction. The track grooves 9 comprise track grooves 9A and 9B that are inclined at the angle γ in the peripheral direction with respect to the joint axial line N-N and adjacent to each other in the peripheral direction with their inclination directions opposite to each other. The inner joint member 3 is assembled to an inner periphery of the outer joint member 2 so that the track grooves 9 cross the paired track grooves 7 of the outer joint member 2. In addition, each ball 4 is arranged in a crossing portion between the paired track grooves 7 and 9 of the outer joint member 2 and the inner joint member 3. Note that, the track grooves 7 and 9 are illustrated in FIG. 1A under a state in which cross sections taken along a plane M illustrated in FIG. 2A and a plane Q illustrated in FIG. 3A are rotated to an inclination angle of γ=0°.

The term "ball raceway center line" is hereinafter used to accurately describe forms (such as inclined state and curved state) of the track grooves. The ball raceway center line refers to a trajectory of the center of the ball when the ball moves along the track groove. Thus, the form of the track grooves corresponds to a form of the ball raceway center lines.

As illustrated in FIG. 1A, a ball raceway center line X of each track groove 7 of the outer joint member 2 and a ball raceway center line Y of each track groove 9 of the inner joint member 3 are each formed into an arc shape having a curvature center at a joint center O. In this way, the curvature centers of the ball raceway center line X of each track groove 7 of the outer joint member 2 and the ball raceway center line Y of each track groove 9 of the inner joint member 3 are each arranged on the joint center O, that is, on the joint axial line N-N. With this, depths of the track grooves can be set equal to each other, and processes therefor can be simplified.

Although detailed illustration is omitted, the track grooves 7 and 9 are formed into an elliptical shape or a Gothic arch shape in horizontal cross section (cross section orthogonal to the axis), and the track grooves 7 and 9 are held in so-called angular contact with each ball 4 at a contact angle of approximately from 30° to 45°. Thus, the ball 4 is held in contact with side surface portions of the track grooves 7 and 9, which are slightly spaced apart from groove bottoms of the track grooves 7 and 9.

Now, supplementary description is given of the reference symbols of the track grooves. Reference symbol 7 represents the track grooves of the outer joint member 2 as a whole. When the track grooves having different inclination directions are to be distinguished from each other, reference symbol 7A represents a track groove inclined on one side in the peripheral direction with respect to the joint axial line N-N, and reference symbol 7B represents a track groove inclined on the other side in the peripheral direction with respect to the joint axial line N-N. The track grooves 9 of the inner joint member 3 are represented by the reference symbols in a similar manner.

Referring to FIG. 2A and FIG. 2B, description is given of a state in which the track grooves 7 of the outer joint member 2 are inclined in the peripheral direction with respect to the joint axial line N-N. As illustrated in FIG. 2A, a plane M including the ball raceway center line X of each track groove 7A and the joint center O is inclined at an angle γ on one side in the peripheral direction with respect to the joint axial line N-N. Further, a plane M (not shown) including the ball raceway center line X of each track groove 7B adjacent to the track groove 7A in the peripheral direction and the joint center O is inclined at an angle γ on the other side in the peripheral direction with respect to the joint axial line N-N (opposite direction to the inclination direction of the track groove 7A).

Figure 3B:
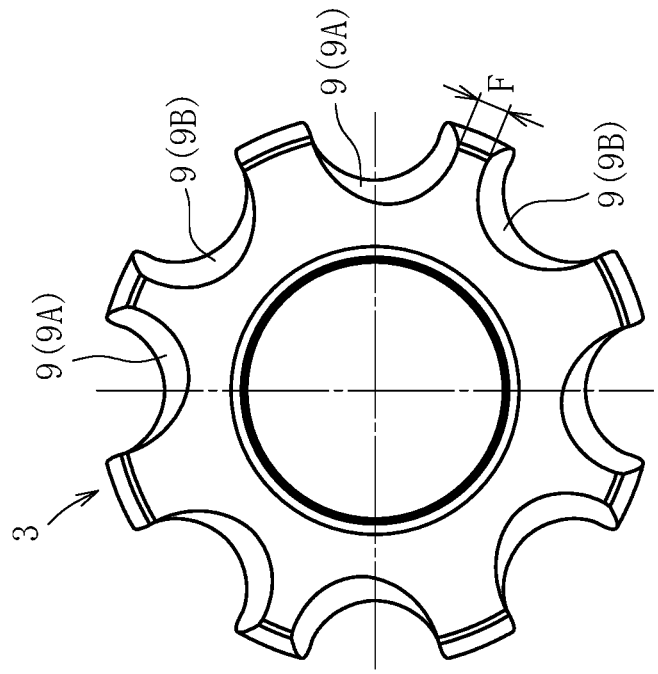
FIG. 3B is a front view of the inner joint member illustrated in FIG. 1.

Referring to FIG. 3A and FIG. 3B, description is given of a state in which the track grooves 9 of the inner joint member 3 are inclined in the peripheral direction with respect to the joint axial line N-N. As illustrated in FIG. 3A, a plane Q including the ball raceway center line Y of each track groove 9A and the joint center O is inclined at an angle γ on one side in the peripheral direction with respect to the joint axial line N-N. Further, a plane Q (not shown) including the ball raceway center line Y of each track groove 9B adjacent to the track groove 9A in the peripheral direction and the joint center O is inclined at an angle γ on the other side in the peripheral direction with respect to the joint axial line N-N (opposite direction to the inclination direction of the track groove 9A). The track grooves 9 (9A and 9B) of the inner joint member 3 are formed so as to be mirror-image symmetrical with the paired track grooves 7 (7A and 7B) of the outer joint member 2 with respect to a joint center plane P at an operating angle of 0°. It is preferred that the above-mentioned angle (inclination angle) γ be set within a range of from 4° to 12° in consideration of operability of the constant velocity universal joint 1 and a spherical width F between the closest sides of the track grooves of the inner joint member 3.

Figure 4:
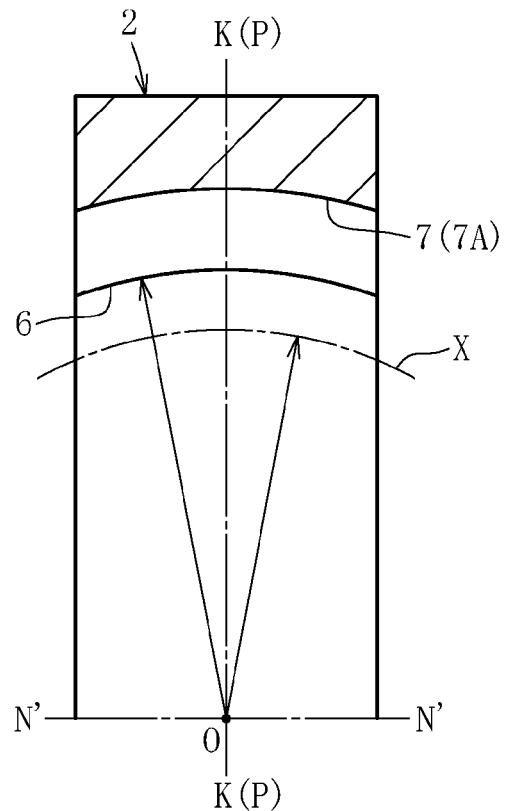
FIG. 4 is a partial vertical sectional view of details of a track groove of the outer joint member illustrated in FIG. 2A.

Next, referring to FIG. 4, detailed description is given of the track grooves of the outer joint member 2 when viewed in a vertical cross section. Note that, FIG. 4 is a sectional view taken along the plane M including the ball raceway center line X of the track groove 7A and the joint center O illustrated in FIG. 2A. That is, FIG. 4 is a sectional view in the plane including an inclined axis N'-N', which is inclined at the angle γ in the peripheral direction with respect to the joint axial line N-N. In FIG. 4, in the track grooves 7A and 7B having different inclination directions from each other, only the track groove 7A is illustrated. In the spherical inner peripheral surface 6 of the outer joint member 2, the track grooves 7A are formed along the axial direction. The track groove 7A has the arc-shaped ball raceway center line X having a curvature center at the joint center O (not offset in the axial direction). When assuming that K represents a perpendicular line at the joint center O, which is perpendicular to the inclined axis N'-N' projected onto the plane M (see FIG. 2A) including the ball raceway center line X of the track groove 7A and the joint center O, the perpendicular line K is located on the joint center plane P at the operating angle of 0°.

Figure 5:
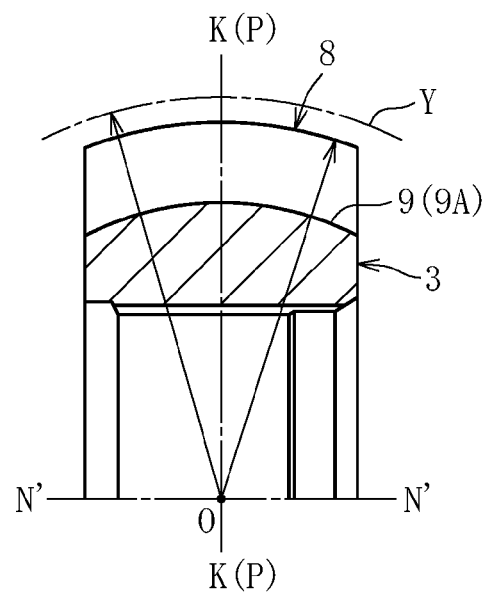
FIG. 5 is a vertical sectional view of details of a track groove of the inner joint member illustrated in FIG. 3A.

Similarly, referring to FIG. 5, detailed description is given of the track grooves of the inner joint member 3. FIG. 5 is a sectional view taken along the plane Q including the ball raceway center line Y of the track groove 9A and the joint center O illustrated in FIG. 3A. That is, FIG. 5 is an illustration of a cross section in the plane including the inclined axis N'-N', which is inclined at the angle γ in the peripheral direction with respect to the joint axial line N-N. In FIG. 5, in the track grooves 9A and 9B having different inclination directions from each other, only the track groove 9A is illustrated. In the spherical outer peripheral surface 8 of the inner joint member 3, the track grooves 9A are formed along the axial direction. The track groove 9A has the arc-shaped ball raceway center line Y having a curvature center at the joint center O (not offset in the axial direction). When assuming that K represents a perpendicular line at the joint center O, which is perpendicular to the inclined axis N'-N' projected onto the plane Q (see FIG. 3A) including the ball raceway center line Y of the track groove 9A and the joint center O, the perpendicular line K is located on the joint center plane P at the operating angle of 0°.

As described above, the track grooves 7 and 9 of the outer joint member 2 and the inner joint member 3 are adjacent to each other in the peripheral direction with their inclination directions opposite to each other, and the paired track grooves 7 and 9 cross each other. Therefore, when both the joint members 2 and 3 rotate relative to each other at the operating angle of 0° illustrated in FIG. 1A, forces in the opposite directions are applied from the balls 4 to pocket portions 5a of the cage 5 that are adjacent to each other in the peripheral direction. Due to the forces in the opposite directions, the cage 5 is stabilized at the position of the joint center O. Thus, a contact force between a spherical outer peripheral surface 12 of the cage 5 and the spherical inner peripheral surface 6 of the outer joint member 2, and a contact force between a spherical inner peripheral surface 13 of the cage 5 and the spherical outer peripheral surface 8 of the inner joint member 3 are suppressed. Accordingly, torque loss and heat generation that may be caused by contact between the spherical surfaces are suppressed effectively. As a result, it is possible to attain a constant velocity universal joint that is excellent in torque transmission efficiency and durability.

FIG. 6A and FIG. 6B are illustrations of a dimensional feature of the propeller shaft-specific constant velocity universal joint 1 according to this embodiment. Note that, both of FIG. 6A and FIG. 6B are illustrations of a cross section taken along the joint axial line N-N. Similarly to the track grooves 7 and 9 illustrated in FIG. 1A, the track grooves 7 and 9 are illustrated in FIG. 6A and FIG. 6B under a state in which the cross sections taken along the plane M illustrated in FIG. 2A and the plane Q illustrated in FIG. 3A are rotated to the inclination angle of γ=0°.

As illustrated in FIG. 6B, when the constant velocity universal joint 1 forms a maximum operating angle θmax, a center Ob of the ball 4 moves to the position of θmax/2 with respect to the joint center plane P at the operating angle of 0°. The maximum operating angle θmax of the constant velocity universal joint 1 according to this embodiment is set to 20°. Thus, when the constant velocity universal joint 1 forms the maximum operating angle θmax, the center Ob of the ball 4 moves by 10° with respect to the joint center plane P at the operating angle of 0°. Lengths of the track grooves 7 and 9 are set so that, in this state, the balls 4 are reliably held in contact with the track grooves 7 of the outer joint member 2 and the track grooves 9 of the inner joint member 3. Specifically, as in the illustration, the lengths of the track grooves are set so that allowance amounts are secured between contact points So and Si between the track grooves 7 and 9 and the ball 4, and end portions of the track grooves 7 and 9. In this case, the description specified in the scope of claims "the plurality of track grooves of the outer joint member and the plurality of track grooves of the inner joint member each have a length corresponding to a maximum operating angle required for a propeller shaft" means that, as described above, "the track grooves have the lengths that are necessary and sufficient for reliably holding the balls in contact with the track grooves when the joint forms the maximum operating angle θmax."

Figure 13A:
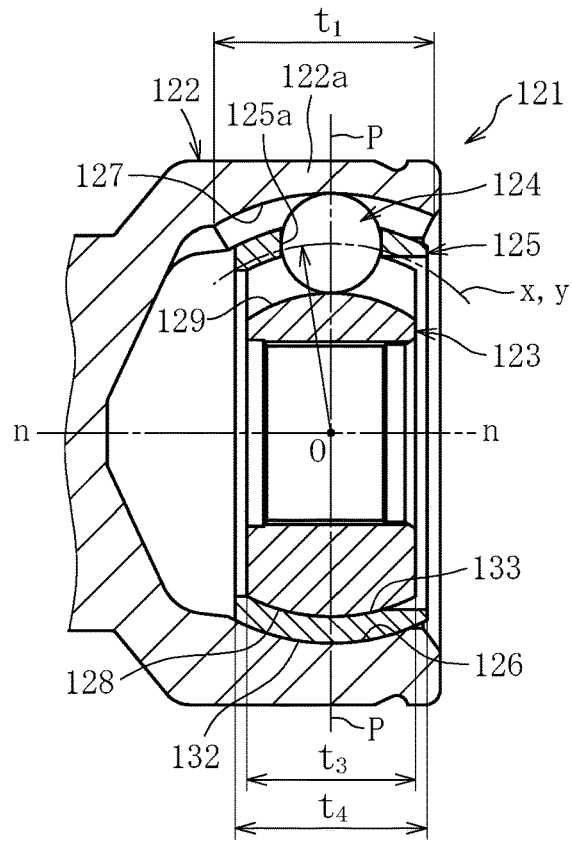
FIG. 13A is a partial vertical sectional view of a related-art fixed type constant velocity universal joint.
Figure 13B:
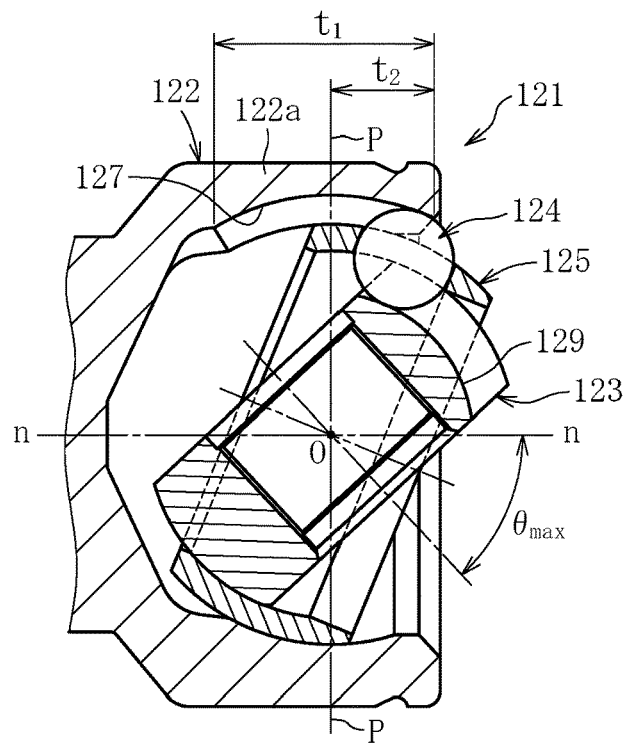
FIG. 13B is a schematic view of a state in which the related-art fixed type constant velocity universal joint forms a maximum operating angle.

Based on the lengths of the track grooves, for example, axial dimensions of the outer joint member 2 and the inner joint member 3 are determined. The maximum operating angle θmax of the constant velocity universal joint 1 according to this embodiment is set to 20°. Thus, as illustrated in FIG. 6A, an axial dimension T1 of the outer joint member 2, an axial dimension T2 from the joint center O to an end portion of the outer joint member 2 on an opening side, an axial dimension T3 of the inner joint member 3, and an axial dimension T4 of the cage 5 are decreased to be sufficiently smaller than those in the fixed type constant velocity universal joint 121 illustrated in FIG. 13, in which the maximum operating angle θmax is set to 47°.

As described above, the axial dimensions $T_1$ and $T_2$ of the outer joint member 2 can be decreased, and hence a weight of the outer joint member 1 and a weight of a material thereof to be loaded can be decreased. Further, lengths of a finishing process on the track grooves 7 and the spherical inner peripheral surface 6 can be decreased. Similarly, the axial dimension $T_3$ of the inner joint member 3 can be decreased, and hence a weight of the inner joint member 3 and a weight of a material thereof to be loaded can be decreased. Further, lengths of a finishing process on the track grooves 9 and the spherical outer peripheral surface 8 can be decreased. In addition, in accordance with downsizing of an interior space of the joint, a use amount of a lubricant (such as grease) can be decreased. With this, the constant velocity universal joint 1 according to this embodiment is even more lightweight and compact than the fixed type constant velocity universal joint 121 illustrated in FIG. 13, which is designed for application to front-wheel drive shafts.

In the constant velocity universal joint 1 according to the embodiment of the present invention, in order to achieve even higher efficiency, the following technical measures were taken.

Figure 7A:
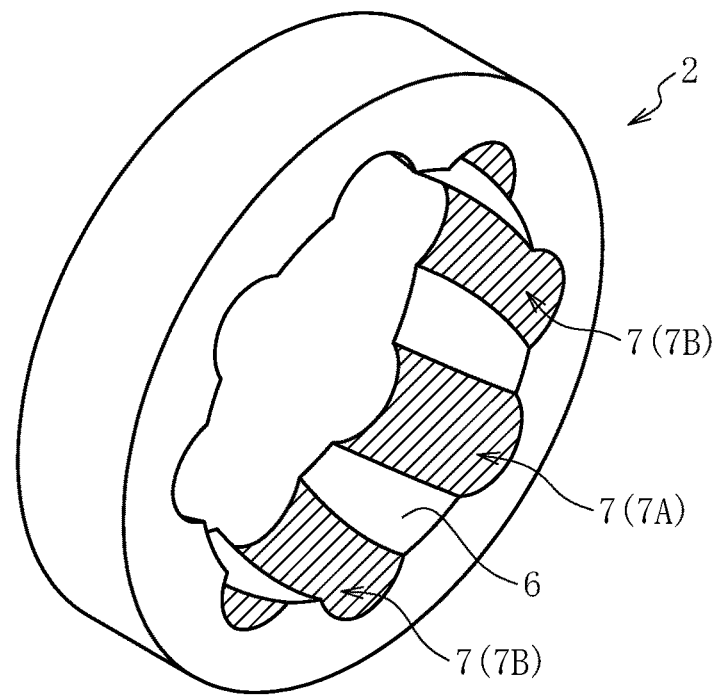
FIG. 7A is a schematic perspective view of the outer joint member.

Specifically, as illustrated in FIG. 7A, surface treatment for decreasing frictional resistance (sliding resistance) against the balls 4 was performed on parts (surfaces) of the outer joint member 2, on which the balls 4 as mating members repetitively roll, specifically, defined surfaces of the track grooves 7 (7A and 7B). Note that, the parts to be subjected to the surface treatment are shaded in FIG. 7A, and the same holds true also in FIG. 7B, FIG. 8A, FIG. 8B, and FIG. 9A to FIG. 9C to be referred to in the following description. As the surface treatment, there may be performed, for example, a process of forming lubricating films containing a solid lubricant (lubricant coating), barreling for forming numerous fine recessed portions to serve as a lubricating oil storage, a process of forming resin films (resin coating), and surface modification processes such as shot peening and shot blasting.

Figure 7B:
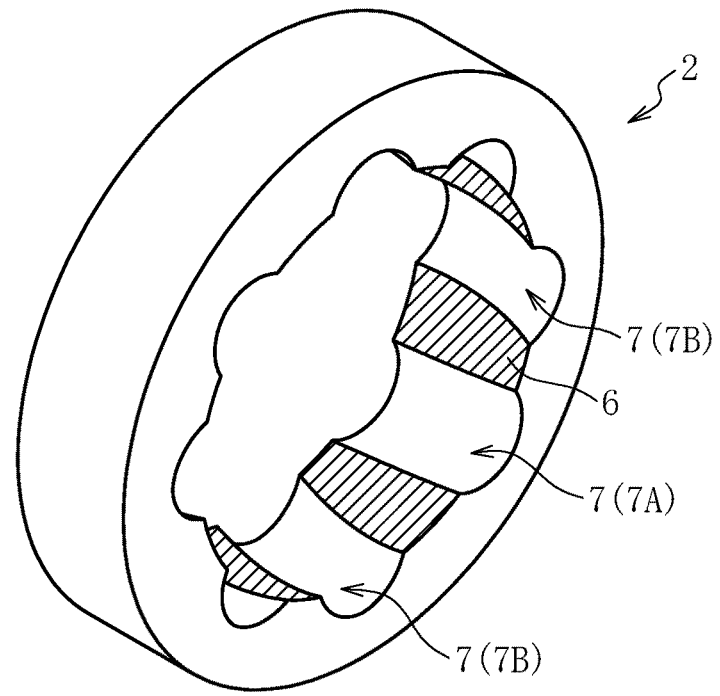
FIG. 7B is a schematic perspective view of the outer joint member.
Figure 8A:
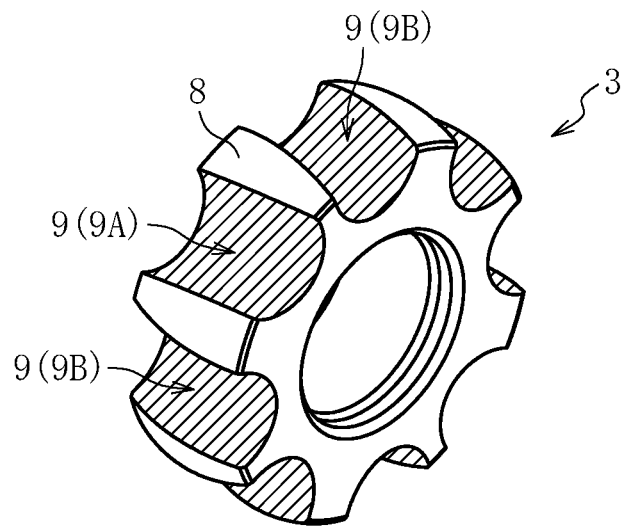
FIG. 8A is a schematic perspective view of the inner joint member.
Figure 8B:
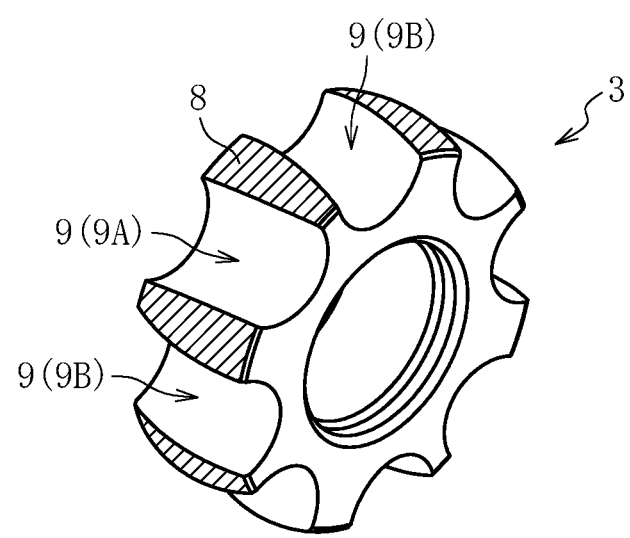
FIG. 8B is a schematic perspective view of the inner joint member.
Figure 9A:
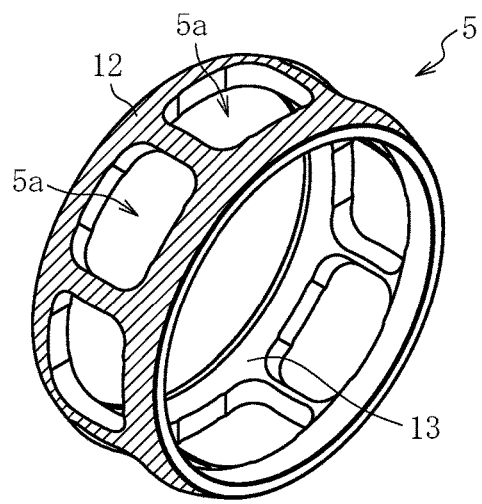
FIG. 9A is a schematic perspective view of a cage.
Figure 9B:
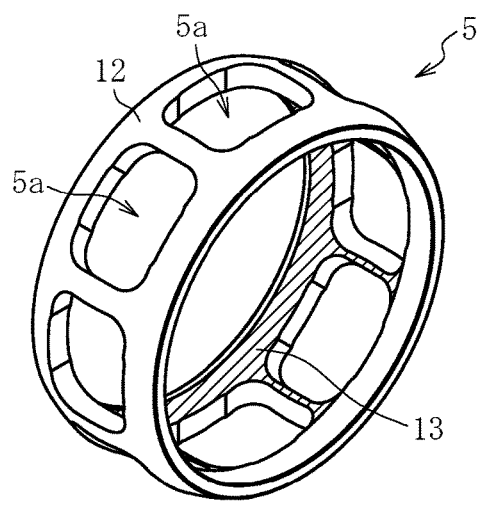
FIG. 9B is a schematic perspective view of the cage.
Figure 9C:
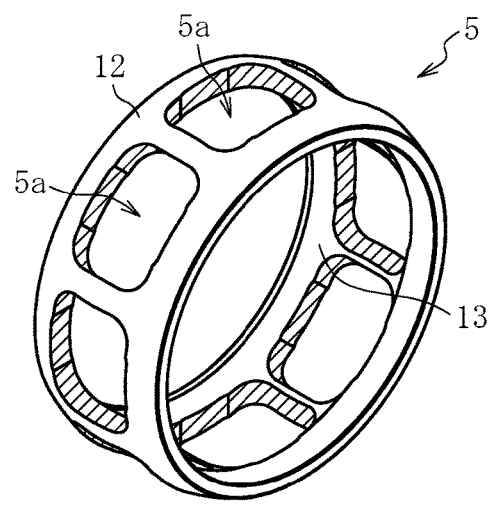
FIG. 9C is a schematic perspective view of the cage.

The above-mentioned surface treatment maybe performed on, in addition to or in place of the defined surfaces of the track grooves 7 of the outer joint member 2, the spherical inner peripheral surface 6 of the outer joint member 2, which may repetitively come into sliding contact with the spherical outer peripheral surface 12 of the cage 5, as illustrated in FIG. 7B. The sliding contact "may" repetitively occur because the fixed type constant velocity universal joint 1 according to the present invention has such a structural feature that, as described above, the contact force between the spherical inner peripheral surface 6 of the outer joint member 2 and the spherical outer peripheral surface 12 of the cage 5 is theoretically almost zero, but the contact force may be generated between the two surfaces 6 and 12 by influence of, for example, machining errors.

Figure 14:
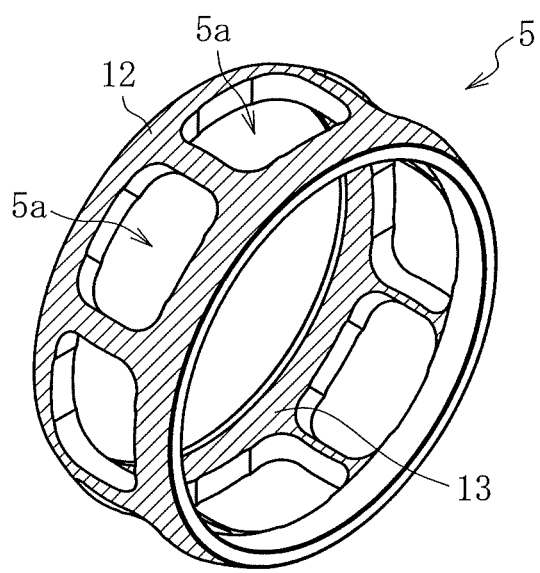
FIG. 14 is a schematic perspective view of the cage.

The above-mentioned surface treatment maybe performed on, in addition to or in place of the defined surfaces of the track grooves 7 and/or the spherical inner peripheral surface 6 of the outer joint member 2, for example, the following parts. (1) Parts of the inner joint member 3, on which the balls 4 repetitively roll, specifically, defined surfaces of the track grooves 9 (9A and 9B) (see FIG. 8A). (2) The spherical outer peripheral surface 8 of the inner joint member 3, which may repetitively come into sliding contact with the spherical inner peripheral surface 13 of the cage 5 (see FIG. 8B). (3) Outer surfaces (not shown) of the balls 4, which repetitively come into sliding contact (abrasion) with the track grooves 7 of the outer joint member 2, the track grooves 9 of the inner joint member 3, and the pocket portions 5a of the cage 5. (4) The spherical outer peripheral surface 12 of the cage 5, which may repetitively come into sliding contact with the spherical inner peripheral surface 6 of the outer joint member 2 (see FIG. 9A). (5) The spherical inner peripheral surface 13 of the cage 5, which may repetitively come into sliding contact with the spherical outer peripheral surface 8 of the inner joint member 3 (see FIG. 9B). (6) The Spherical outer peripheral surface 12 of the cage 5, which may repetitively come into sliding contact with the spherical inner peripheral surface 6 of the joint member 2, and the spherical inner peripheral surface 13 of the cage 5, which may repetitively come into sliding contact with the spherical outer peripheral surface 8 of the inner joint member 3 (see FIG. 14). (7) Defined surfaces of the pocket portions 5a of the cage 5, which are repetitively abraded against the balls 4 (see FIG. 9C; note that, the surface treatment only needs to be performed on surfaces opposed to each other in the axial direction). In short, it is only necessary that the above-mentioned surface treatment be performed on at least one of the surfaces that (may) repetitively come into sliding contact with the mating members, and the surface to be subjected to the above-mentioned surface treatment maybe selected as appropriate in consideration of required torque transmission efficiency and cost performance. The above-mentioned surface treatment is applied also to constant velocity universal joints 1 according to other embodiments described later, but description thereof is omitted for the sake of simplicity of description.

Through the surface treatment as described above, the frictional resistance (sliding resistance) in contact portions between the components of the constant velocity universal joint 1 can be decreased. With this, the torque loss and the heat generation can be further suppressed, and even higher efficiency and an even longer life of the fixed type constant velocity universal joint 1 can be achieved. Note that, from a viewpoint of effective suppression of the torque loss and the heat generation (from a viewpoint of cost effectiveness), it is particularly preferred that the above-mentioned surface treatment be performed on the surfaces to which great contact forces are repetitively applied, specifically, at least one surface selected from the group consisting of the defined surfaces (see FIG. 7A) of the track grooves 7 of the outer joint member 2, the defined surfaces (see FIG. 8A) of the track grooves 9 of the inner joint member 3, and the defined surfaces (see FIG. 9C) of the pocket portions 5a of the cage 5.

Figure 10:
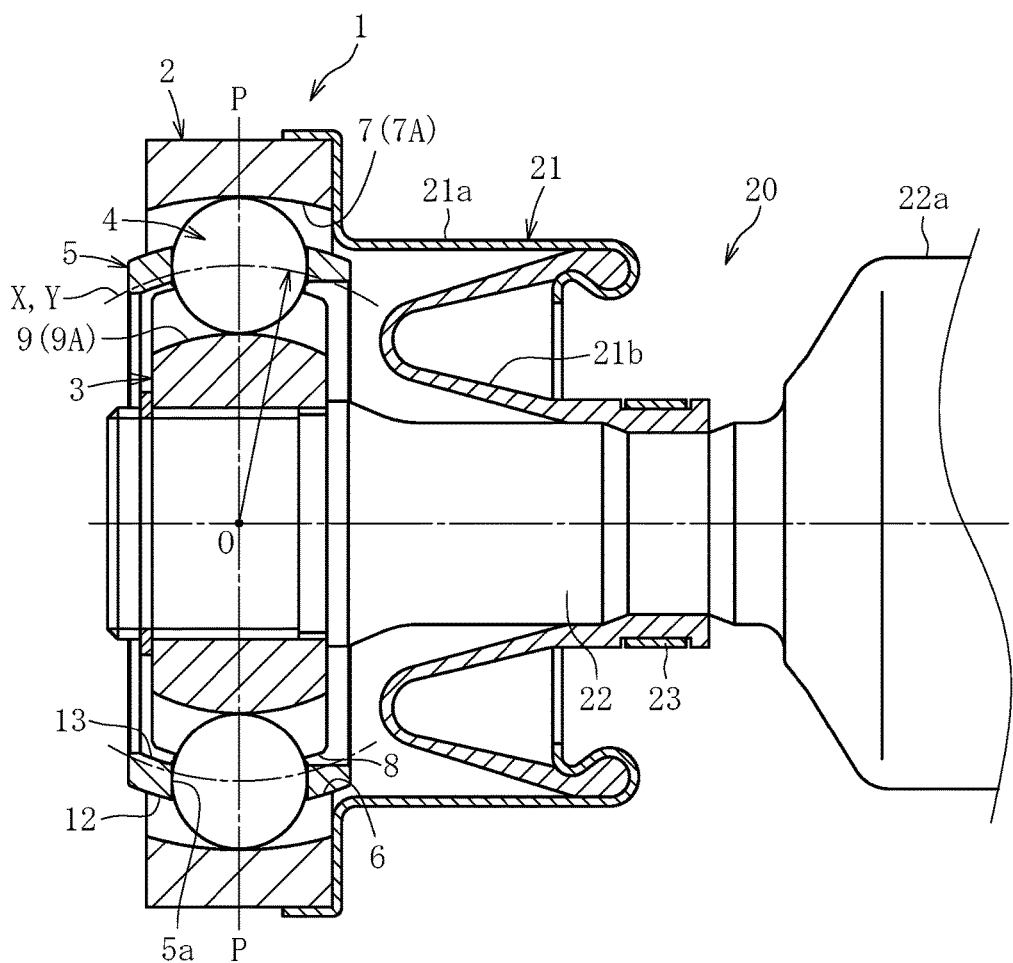
FIG. 10 is a schematic sectional view of a propeller shaft comprising the fixed type constant velocity universal joint illustrated in FIG. 1.

FIG. 10 is a schematic sectional view of a propeller shaft comprising the fixed type constant velocity universal joint 1 described above. The propeller shaft 20 comprises the fixed type constant velocity universal joint 1, a shaft 22 comprising one axial end portion that is spline-coupled to a hole portion of the inner joint member 3, and a boot 21 mounted to an outer peripheral surface of the outer joint member 2 and an outer peripheral surface of the shaft 22 so as to prevent the grease sealed inside the joint as the lubricant from leaking to an outside. The shaft 22 comprises a large-diameter pipe portion 22a, and another fixed type or plunging type constant velocity universal joint (not shown) is coupled to the other axial end portion of the shaft 22. The boot 21 comprises a sealing ring 21a fixed to the outer peripheral surface of the outer joint member 2, and an elastic boot portion 21b comprising one end fixed to the sealing ring 21a and the other end mounted to the shaft 22 with a boot band 23. Note that, although detailed illustration is omitted, the sealing ring 21a of the boot 21 is fixed to the outer peripheral surface of the outer joint member 2, for example, by crimping.

The propeller shaft 20 uses the fixed type constant velocity universal joint 1 according to the present invention, and hence it is possible to attain a propeller shaft that is further suppressed in torque loss and heat generation and enhanced in efficiency, and is also lightweight and compact. An automobile having the propeller shaft 20 mounted therein is excellent in torque transmission efficiency, and hence can be suppressed in fuel consumption.

Figure 11A:
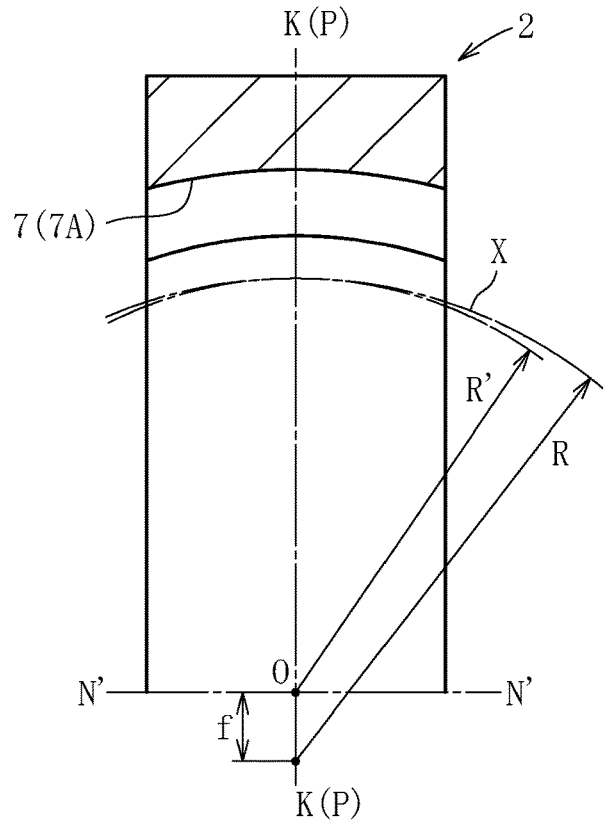
FIG. 11A is a partial vertical sectional view of an outer joint member to be used in a fixed type constant velocity universal joint according to a second embodiment of the present invention.
Figure 11B:
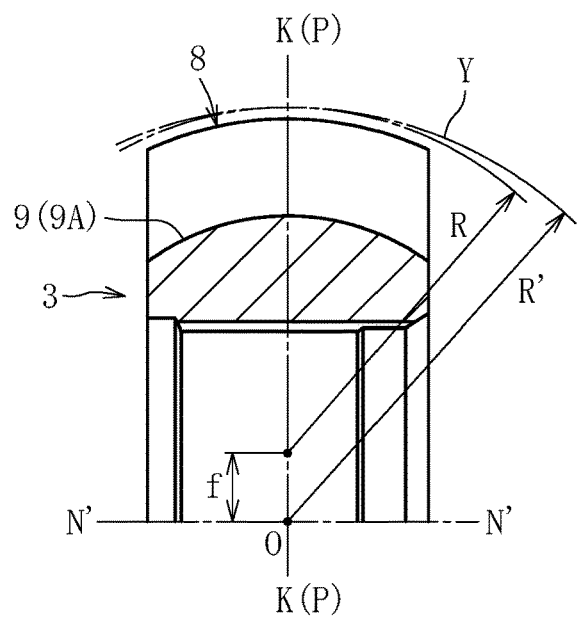
FIG. 11B is a partial vertical sectional view of an inner joint member to be used in a fixed type constant velocity universal joint according to a third embodiment of the present invention.

FIG. 11A is a partial sectional view of an outer joint member to be used in a fixed type constant velocity universal joint according to a second embodiment of the present invention. FIG. 11B is a partial sectional view of an inner joint member to be used in a fixed type constant velocity universal joint according to a third embodiment of the present invention. Note that, similarly to FIG. 4, FIG. 11A is a partial sectional view of the outer joint member taken along the plane M (see FIG. 2A) including the ball raceway center line X of the track groove 7A and the joint center O. Similarly to FIG. 5, FIG. 11B is a partial sectional view of the inner joint member taken along the plane Q (see FIG. 3A) including the ball raceway center line Y of the track groove 9A and the joint center O. The constant velocity universal joints according to the second and third embodiments are different from the fixed type constant velocity universal joint 1 according to the first embodiment described above mainly in that the curvature center of each of the track grooves (ball raceway center lines) is arranged at a position offset by "f" in a radial direction with respect to the joint axial line N-N (not offset in the axial direction with respect to the joint center O). That is, in the second and third embodiments, the curvature center of the ball raceway center line of each of the track grooves is offset by "f" in the radial direction in the joint center plane P including the perpendicular line K at the operating angle of 0°.

Under the state illustrated in FIG. 11A, when the curvature center of the ball raceway center line X of the track groove 7 (7A or 7B) of the outer joint member 2 is offset by "f" in the radial direction with respect to the joint axial line N-N, the groove depth of the track groove 7 (7A or 7B) of the outer joint member 2 can be increased (see reference symbols R and R' in FIG. 11A; note that, in this case, the groove depths of the track grooves 9 of the inner joint member 3 assembled to the inner periphery of the outer joint member 2 are decreased). On the other hand, under the state illustrated in FIG. 11B, when the curvature center of the ball raceway center line Y of the track groove 9 (9A or 9B) of the inner joint member 3 is offset by "f" in the radial direction with respect to the joint axial line N-N, the groove depth of the track groove 9 (9A or 9B) of the inner joint member 3 can be increased (see reference symbols R and R' in FIG. 11B; note that, in this case, the groove depths of the track grooves 7 of the outer joint member 2 having the inner periphery to which the inner joint member 3 is assembled are decreased). In short, as illustrated in FIG. 11A and FIG. 11B, when the curvature center of the ball raceway center line of each of the track grooves is offset in the radial direction with respect to the joint axial line N-N, the depths of the track grooves can be adjusted in accordance with the direction and the amount of the offset. Note that, other structural features are common to those of the fixed type constant velocity universal joint 1 according to the first embodiment, and hence detailed description thereof is omitted.

FIG. 12A and FIG. 12B are illustrations of a fixed type constant velocity universal joint 1 according to a fourth embodiment of the present invention. The constant velocity universal joint 1 according to this embodiment is structurally different from the fixed type constant velocity universal joint 1 described above in that the number of the balls is set to six. When the number of the balls is set to six as in this case, there are advantages in that the total number of components is smaller than that in the case where the number of the balls is set to eight, that satisfactory processability and assembly efficiency of the members can be achieved, and that a load capacity can be increased in accordance with increase in size of the balls.

In the above description, the present invention is applied to the fixed type constant velocity universal joint comprising the eight or six balls. However, the present invention is also suitably applicable to a fixed type constant velocity universal joint comprising ten or twelve balls.

Further, the above description is directed to the case where the present invention is applied to the fixed type constant velocity universal joint having the track grooves arranged at a regular pitch in the peripheral direction. However, the present invention is also suitably applicable to a fixed type constant velocity universal joint having the track grooves arranged at an irregular pitch in the peripheral direction. Still further, in the above-mentioned fixed type constant velocity universal joint, the inclination angles γ of the track grooves with respect to the joint axial line N-N are set equal to each other in all the track grooves, but the present invention is not limited thereto. As long as the inclination angles γ of the paired track grooves of the outer joint member and the inner joint member are set equal to each other, the inclination angles γ of the track grooves may be set unequal to each other. In short, it is only necessary that the inclination angles be set so that the axial forces of the balls are applied in a balanced manner as a whole to all the pockets of the cage. Further, in the above description, the present invention is applied to the fixed type constant velocity universal joint configured so that the track grooves and the balls are held in contact (angular contact) at a contact angle. However, the present invention is not limited thereto. The present invention is also suitably applicable to a fixed type constant velocity universal joint configured so that the track grooves and the balls are held in circular contact by forming the track grooves into an arc shape in horizontal cross section.

The present invention is not limited to the embodiments described above, and as a matter of course, may be carried out in various other embodiments without departing from the spirit of the present invention. The scope of the present invention is defined in the claims, and encompasses meaning of equivalents described in the claims and all modifications within the scope of claims.

REFERENCE SIGNS LIST 1 fixed type constant velocity universal joint
2 outer joint member
3 inner joint member
4 ball
5 cage
5a pocket portion
6 spherical inner peripheral surface
7 track groove
8 spherical outer peripheral surface
9 track groove
12 spherical outer peripheral surface
13 spherical inner peripheral surface
20 propeller shaft
K perpendicular line
M plane (plane including ball raceway center line)
N joint axial line
O joint center
P joint center plane (joint center plane at operating angle of 0°)
Q plane (plane including ball raceway center line)
X ball raceway center line
Y ball raceway center line
γ inclination angle
θ operating angle

The invention claimed is:

1. A fixed type constant velocity universal joint, comprising:
   an outer joint member having a spherical inner peripheral surface in which a plurality of track grooves are formed so as to extend in an axial direction of the outer joint member;
   an inner joint member having a spherical outer peripheral surface in which a plurality of track grooves are formed so as to be paired with the plurality of track grooves of the outer joint member;
   balls for transmitting torque,
      the balls being interposed between the plurality of track grooves of the outer joint member and the plurality of track grooves of the inner joint member, which are paired with each other; and
   a cage comprising pocket portions for receiving the balls, the cage having:
      a spherical outer peripheral surface fitted to the spherical inner peripheral surface of the outer joint member; and
      a spherical inner peripheral surface fitted to the spherical outer peripheral surface of the inner joint member,
   wherein the plurality of track grooves of the outer joint member are each formed into an arc shape having a curvature center that is prevented from being offset in the axial direction with respect to a joint center, the plurality of track grooves of the outer joint member being inclined in a peripheral direction of the outer joint member with respect to a joint axial line and being adjacent to each other in the peripheral direction with their inclination directions opposite to each other,
   wherein the plurality of track grooves of the inner joint member are formed so as to be mirror-image symmetrical with the plurality of paired track grooves of the outer joint member with respect to a joint center plane at an operating angle of 0°,
   wherein the fixed type constant velocity universal joint is to be assembled to a propeller shaft,
   wherein the plurality of track grooves of the outer joint member and the plurality of track grooves of the inner joint member each have a length that is necessary and sufficient for reliably holding the balls in contact with the plurality of track grooves of the outer joint member and the plurality of track grooves of the inner joint member when the fixed type constant velocity universal joint forms an operating angle corresponding to a maximum operating angle of the propeller shaft,
   wherein the fixed type constant velocity universal joint is subjected to surface treatment at the spherical inner peripheral surface of the outer joint member, the spherical outer peripheral surface of the inner joint member, the spherical outer peripheral surface of the cage, and the spherical inner peripheral surface of the cage, the surface treatment being performed so as to reduce frictional resistance of the spherical inner peripheral surface of the outer joint member, the spherical outer peripheral surface of the inner joint member, the spherical outer peripheral surface of the cage, and the spherical inner surface of the cage against a mating member that relatively moves in contact therewith.

2. The fixed type constant velocity universal joint according to claim 1, wherein the curvature center of the each of the plurality of track grooves of the outer joint member and a curvature center of the each of the plurality of track grooves of the inner joint member are arranged on the joint axial line.

3. The fixed type constant velocity universal joint according to claim 1, wherein the curvature center of the each of the plurality of track grooves of the outer joint member and a curvature center of the each of the plurality of track grooves of the inner joint member are arranged at positions offset in a radial direction of each of the outer joint member and the inner joint member with respect to the joint axial line.

4. The fixed type constant velocity universal joint according to claim 1, wherein a number of the balls is set to six, eight, ten, or twelve.

5. The fixed type constant velocity universal joint according to claim 1, wherein the surface treatment is lubricant coating or resin coating.

\* \* \* \* \*